UNITED STATES PATENT OFFICE 2,023,890

PRODUCTION OF METAL CARBAMATES

Ernst Kuss, Mannheim, and Emil Germann, Heidelberg, Germany, assignors to I. G. Farbenindustrie Aktiengesellschaft, Frankfort-on-the-Main, Germany, a corporation of Germany No Drawing. Application November 11, 1929, Serial No. 406,510. In Germany December 24, 1928

5 Claims. (Cl. 260—112)

The present invention relates to the production of metal carbamates.

We have found that metal carbamates, as for example calcium carbamate, can be obtained in a simple manner from the readily obtainable ammonium carbamate by bringing the same to conversion with inorganic metal compounds, for example calcium chloride, in inert liquid solvents capable of dissolving the ammonium carbamate and the metal compounds, even if only to a slight extent, that is solvents in which ammonium carbamate is soluble without the carbamate radical suffering conversion.

Alcohols, such as methanol, ethanol and other alcohols, formamide and liquid ammonia are for example suitable as the solvents. According to the solubility of the ammonium carbamate, which should be as great as possible, and according to the solubility of the metal carbamate to be produced therefrom, which should be as small as possible, the process is carried out either at ordinary, high or low temperatures, and according to the temperatures employed, at ordinary or elevated pressures. It is recommended that the conversion be carried out in the absence of water. If, however, the solvent has strongly hygroscopic properties, as for example liquid ammonia, small quantities of water may be present, and this may even be desirable for increasing the solubility of the initial materials. Other substances, for example those which influence the solubility of the initial material or the final product in a favourable manner, for example ammonium nitrate in the case of liquid ammonia, may be added to the solvents.

The metal carbamates obtained may then be further worked up into valuable conversion products. For example calcium carbamate may be converted into calcium cyanamide or potassium carbamate into potassium carbonate.

Moreover, without previous separation of the metal carbamates, the solvent may be simply removed, for example by evaporation, and in this manner salt mixtures are obtained, in which mixtures the metal carbamates may be converted as hereinbefore described. In this manner for example valuable mixed fertilizers can be obtained. Further, salts and the like, for example plant nutrients which are still lacking, may be added before or after the removal of the solvents, especially when the salt mixtures are to be employed as fertilizers.

The following examples will further illustrate how this invention may be carried out in practice, but the invention is not restricted to these examples.

Example 1

Sodium chloride is dissolved in liquid ammonia. A solution of ammonium carbamate in liquid ammonia in which further ammonium carbamate is suspended is then gradually introduced into this solution, while stirring, at room temperature and under an elevated pressure of about 8 atmospheres. Sodium carbamate is precipitated and may be separated from the ammonium chloride which is dissolved in the liquid ammonia by filtration.

Example 2

Calcium chloride is dissolved in ethyl alcohol, and to this solution a dilute solution of ammonium carbamate in ethyl alcohol is gradually added at a temperature of 50° C. and at ordinary pressure. Calcium carbamate containing calcium chloride is precipitated. The ammonium chloride remains dissolved in large proportions in the ethyl alcohol and is separated from the carbamate by filtration. By washing the salt with ethyl alcohol it is obtained anhydrous.

Example 3

A solution of ammonium carbamate in methanol is added to a suspension of calcium hydroxide in methanol. The calcium carbamate thus formed is separated from the mother liquor by filtration and is converted into calcium cyanamide by heating.

Example 4

Potassium nitrate is dissolved in liquid ammonia and a solution of ammonium carbamate in liquid ammonia containing further ammonium carbamate in suspension is then added to this solution. The working temperature is about from 50° to 70° C. Finely divided ammonium phosphate is then added to the mixture. The liquid ammonia is allowed to evaporate. The residue contains ammonium phosphate, ammonium nitrate and potassium carbamate thoroughly mixed.

Example 5

To a solution of barium oxide in methanol, in which further amounts of barium oxide are suspended, is added a solution of ammonium carbamate in methanol. It is advantageous to employ an excess of ammonium carbamate over the barium oxide. Barium carbamate is precipitated, which is separated from the mother liquor by filtration and washed with methanol.

Example 6

A solution of zinc nitrate in methanol is slowly added at room temperature and under atmospheric pressure to a solution of ammonium carbamate in methanol, while stirring. Zinc carbamate is precipitated, which is filtered off and washed with methanol and ether.

What we claim is:—

1. The process of producing metal carbamates, which comprises acting with ammonium carbamate in a monohydric aliphatic alcohol with up to 2 carbon atoms on an inorganic metal compound soluble therein, substantially in the absence of water.

2. The process of producing metal carbamates, which comprises acting with ammonium carbamate in ethyl alcohol on an inorganic metal compound soluble therein, substantially in the absence of water.

3. The process of producing calcium carbamate, which comprises acting with ammonium carbamate on a calcium salt in an inert liquid solvent for the ammonium carbamate and said calcium salt, substantially in the absence of water.

4. The process of producing calcium carbamate, which comprises acting with ammonium carbamate on calcium chloride in ethyl alcohol, substantially in the absence of water.

5. The process of producing calcium carbamate which comprises acting with a dilute solution of ammonium carbamate in ethyl alcohol on a solution of calcium chloride in ethyl alcohol at a temperature of 50° C., substantially in the absence of water.

ERNST KUSS.
EMIL GERMANN.